United States Patent [19]

Shiraishi et al.

[11] 4,071,601
[45] Jan. 31, 1978

[54] SELECTIVE REMOVAL OF NITROGEN OXIDES FROM WASTE GASES USING V-MO-W CATALYSTS

[75] Inventors: Tatsuo Shiraishi; Shinkichi Shimizu; Tadashi Shindo, all of Niihama, Japan

[73] Assignee: Sumitomo Chemical Company, Limited, Osaka, Japan

[21] Appl. No.: 662,284

[22] Filed: Feb. 27, 1976

Related U.S. Application Data

[63] Continuation of Ser. No. 447,377, March 1, 1974, abandoned.

[30] Foreign Application Priority Data

Mar. 6, 1973 Japan .................................. 48-26759
Sept. 18, 1973 Japan ................................ 48-105660

[51] Int. Cl.$^2$ ........................ B01J 8/00; C01B 21/00
[52] U.S. Cl. .................................. 423/239; 252/464; 252/465; 252/467; 423/351
[58] Field of Search ....................... 423/235, 239, 351; 252/456, 458, 467, 464, 465

[56] References Cited

U.S. PATENT DOCUMENTS

| | | | |
|---|---|---|---|
| 2,885,409 | 5/1959 | Ryder | 242/456 |
| 3,005,831 | 10/1961 | Driebelbis | 252/456 |
| 3,279,884 | 10/1966 | Nonnemacher | 423/239 |
| 3,397,154 | 8/1968 | Talsma | 252/465 |

*Primary Examiner*—O. R. Vertiz
*Assistant Examiner*—Eugene T. Wheelock
*Attorney, Agent, or Firm*—Birch, Stewart, Kolasch and Birch

[57] ABSTRACT

A process for selective removal of nitrogen oxides from waste gases containing 1,500 ppm or less (gas volume) of nitrogen oxides by contacting the waste gases with a metal oxide catalyst containing vanadium oxide and at least one of molybdenum oxide and tungsten oxide with an atomic ratio of the oxide forming elements of:

$$V_{12-x-y}Mo_xW_y$$

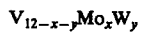

wherein $0 \leq x \leq 8$, $0 \leq y \leq 5$ and $0.3 \leq x + y \leq 8$, at a temperature of 150° to 700° C in the presence of 0.3 to 4 mol of ammonia (on the basis of 1 mol of the nitrogen oxides).

15 Claims, 1 Drawing Figure

FIGURE
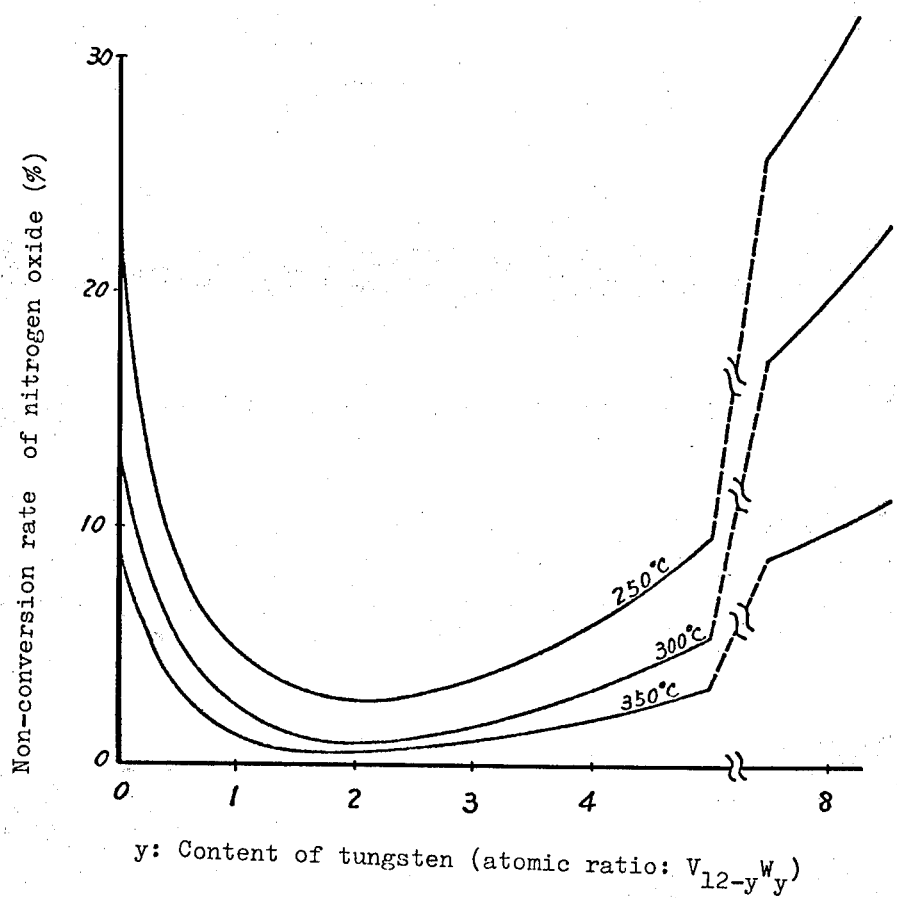
y: Content of tungsten (atomic ratio: $V_{12-y}W_y$)

SELECTIVE REMOVAL OF NITROGEN OXIDES FROM WASTE GASES USING V-MO-W CATALYSTS

This application is a continuation of copending application Ser. No. 447,377, filed on Mar. 1, 1974, now abandoned.

The present invention relates to the selective removal of nitrogen oxides from waste gases exhausted from a boiler, heating furnace or internal combustion engine or in a step of treatment of metal with nitric acid. More particularly, it relates to the selective removal of nitrogen oxides from waste gases which comprises contacting the waste gases containing nitrogen oxides with a metal oxide catalyst containing vanadium oxide and at least one of molybdenum oxide and tungsten oxide in the presence of ammonia, and thereby the nitrogen oxides are catalytically reduced to nitrogen gas which is harmless to the human body.

Among the nitrogen oxides in waste gases, nitrogen monoxide and nitrogen dioxide are the most harmful to the human body and cause photochemical smog (smoke-fog), which presents a social problem from the viewpoint of air pollution.

There have, hitherto, been considered various countermeasures against sulfur dioxide, hydrocarbons and carbon monoxide among the air pollutants, but the countermeasure against nitrogen oxides has not been effectively developed.

Under the circumstances, the present inventors have studied a method for the selective removal of nitrogen oxides from waste gases by contacting the waste gases containing nitrogen oxides with a catalyst containing metal oxides in the presence of ammonia to reduce the nitrogen oxides to nitrogen gas.

It is known that in such a method, there is used a catalyst containing vanadium oxide, molybdenum oxide or tungsten oxide (German Patent Specification 1,253,685 and U.S. Pat. No. 3,279,884). However, the method has some problems that its catalytic activity is inferior against waste gases containing relatively lower concentrations of nitrogen oxides and further that the catalyst life is rather short when the catalyst is subjected to waste gases containing sulfur oxides.

The catalytic activity is largely affected by the concentration of nitrogen oxides in the waste gas and the concentration of the oxygen, steam and sulfur present therein.

The concentration of nitrogen oxides contained in waste gases exhausted from a boiler or an internal combustion engine is usually in a range of 100 to 1,500 ppm, wherein 5 to 10 % by mol is nitrogen dioxide and the remainder is nitrogen monoxide, and further the waste gases contain 2 to 4 % by mol of oxygen and 10 to 15 % by mol of steam.

When the concentration of nitrogen oxides in waste gases is rather low, there results an increase of the ratio of the ammonia which burns by means of the oxygen which is present therein being coexistent in a concentration of 20 to 400 times of the concentration of nitrogen oxides, and as the result, the reduction of nitrogen oxides with ammonia is inhibited and further nitrogen oxides are produced by the combustion of ammonia. This means that the selective removal of nitrogen oxides is not sufficient.

According to the present inventors' studies, it has now been found that the selective removal of nitrogen oxides from waste gases containing a low concentration of nitrogen oxides can be effectively carried out by using a metal oxide catalyst containing vanadium oxide and at least one of molybdenum oxide and tungsten oxide with an atomic ratio of the oxide forming element of:

$$V_{12-x-y}Mo_xW_y$$

wherein $0 \leq x \leq 8$, $0 \leq y \leq 5$, and $0.3 \leq x + y \leq 8$.

According to the present invention, the nitrogen oxides can be removed in a high rate, even when the waste gas is exhausted from a boiler or an internal combustion engine.

The selective removal of nitrogen oxides from waste gases in accordance with the present invention comprises contacting the waste gases containing 1,500 ppm or less (gas volume) of nitrogen oxides with a metal oxide catalyst containing vanadium oxide and at least one of molybdenum oxide and tungsten oxide with an atomic ratio of the oxide forming elements of $V_{12-x-y}Mo_xW_y$, wherein $0 \leq x \leq 8$, $0 \leq y \leq 5$ and $0.3 \leq x + y \leq 8$, at 150° to 700° C in the presence of 0.3 to 4 mol of ammonia (on the basis of 1 mol of the nitrogen oxides contained in the waste gases), and thereby the nitrogen oxides are catalytically reduced to nitrogen gas.

According to the present method, the nitrogen oxides contained in waste gases can be almost completely removed, and the amount of the nitrogen oxides released from the outlet of the reactor, i.e. the non-conversion rate of the nitrogen oxides can be extremely decreased in comparison with the conventional methods which use a catalyst containing vanadium oxide, molybdenum oxide or tungsten oxide.

The accompanying FIGURE shows the relationship between the catalyst components (atomic ratio) and the non-conversion rate of nitrogen oxide (NO), in which a mixed gas containing 85 to 87 % by mol of nitrogen, 2.6 to 2.7 % by mol of oxygen, 11 to 13 % by mol of steam, 550 to 600 ppm of nitrogen monoxide and 550 to 600 ppm of ammonia is passed through the catalyst at a space velocity of 13,500 to 13,700 hr$^{-1}$ at 250° C, 300° C or 350° C. In the FIGURE, the abscissa axis represents $y$ which shows the content of tungsten and the ordinate axis represents the non-conversion rate of nitrogen oxide. As is made clear by the FIGURE, the non-conversion rate of nitrogen oxides is significantly decreased by using a catalyst of a mixture of vanadium oxide and tungsten oxide, and particularly when the numeral of $y$ is nearly equal to 2, i.e. the atomic ratio of vanadium and tungsten is 10 : 2, the non-conversion rate becomes nearly minimal.

The catalyst of the present invention contains vanadium oxide and at least one of molybdenum oxide and tungsten oxide wherein the atomic ratio of the oxide forming elements is $V_{12-x-y}Mo_xW_y$, wherein $0 \leq x \leq 8$, $0 \leq y \leq 5$ and $0.3 \leq x + y \leq 8$. Particularly, in a catalyst consisting of an active component of vanadium oxide and molybdenum oxide, $x$ is 2 to 8, more preferable 2 to 7, in a catalyst consisting of an active component of vanadium oxide and tungsten oxide, $y$ is 0.3 to 5, preferably 1 to 3, and in a catalyst consisting of an active component of vanadium oxide, molybdenum oxide and tungsten oxide, $0 \leq x \leq 4$, $0 \leq y \leq 3$ and $1 \leq x + y \leq 5$ is more preferable. When the molybdenum component or the tungsten component is greater ($8 \leq x$, $5 \leq y$, or $8 \leq x + y$), the temperature for obtaining the maximum conversion rate of nitrogen oxides is higher and further the conversion rate (i.e. removal rate) of nitrogen oxides significantly decreases. On the other hand, when the vanadium component is greater ($x + y \leq 0.3$), the temperature for obtaining the maximum conversion rate of nitrogen oxides does not vary, but the conversion rate of nitrogen oxides decreases.

It is not clear in what states the vanadium, molybdenum and tungsten are contained in the catalyst, but the vanadium may be penta- or tetravalent and molybdenum and tungsten may be hexavalent in an oxidative atmosphere containing molecular oxygen during the preparation of the catalyst, and the catalyst may further contain complex oxides of vanadium and molybdenum, such as $Mo_6V_9O_{40}$.

The catalyst may be composed of the catalyst components alone, i.e. without using any carrier, which may be in the form of granules, tables or extrusion molded products. It may be, however, preferable to have the catalyst supported on conventional carriers for the purpose of increasing the mechanical strength and the homogeneity of the catalyst components. The conventional catalyst carriers may be activated alumina, $\alpha$-alumina, silica gel. alumino-silicate, diatomaceous earth, silicon carbide, titanium oxide or the like. The carriers may be used in the form of granules, tables or extrusion-molded products or in the form of a sol. When it is in the form of a sol, it may be admixed with the catalyst components and then prepared in the desired forms.

The starting material of vanadium oxide for the present catalyst may be vanadium oxides (e.g. divanadium pentaoxide, divanadium tetraoxide or divanadium trioxide), vanadium complexes (e.g. vanadyl oxalate, vanadyl chloride or a chelate compound with an organic amine) or salts (e.g. ammonium metavanadate). The starting material of molybdenum oxide may be molybdenum oxides (e.g. molybdenum trioxide or molybdenum dioxide), molybdic acid, molybdenum complexes (e.g. a chelate compound with an organic amine) or salts (e.g. ammonium molybdate). The starting material of tungsten oxide may be tungsten oxides (e.g. tungsten trioxide or tungsten dioxide), tungstic acid, tungsten complexes (e.g. a chelate compound with an organic amine) or salts (e.g. ammonium tungstate). The most preferred starting material are water soluble salts of vanadium, molybdenum and tungsten for the purpose of mixing the catalyst components homogeneously. Various ethanolamines, amines, and oxalic acid may be used for forming complex compounds of the vanadium, molybdenum and tungsten compounds and thereby increasing the solubility thereof. When the vanadium, molybdenum and tungsten compounds are penetrated into a formed catalyst carrier to give the catalyst, the water soluble starting materials are the most preferable.

The catalyst used in the present invention may be prepared, for example, by mixing a solution of ammonium metavanadate in water containing monoethanolamine, a solution of ammonium molybdate in water containing ammonia and a solution of ammonium tungstate in water containing monoethanolamine so as to give a fixed atomic ratio of vanadium, molybdenum and tungsten, and penetrating the resulting mixture into an activated alumina being in granular or tablet form, and then drying the penetrated product. The drying may be carried out at 60° to 250° C until it becomes substantially anhydrous. After drying, the catalyst may be calcined at 300° to 700° C, preferably 350° to 500° C for 4 to 10 hours.

When the present catalyst is used for the removal of nitrogen oxides from waste gases exhausted from a boiler, heating furnace or the like, it may be generally charged into an appropriate reactor such as a fixed bed reactor, a fluidized bed reactor, etc.

The reaction temperature suitable for the present selective removal of nitrogen oxides may vary depending upon the components of the catalyst, components of the gases to be treated and the space velocity of the gases to be treated, but may be usually in a range of 150° to 700° C, preferably 200° to 400° C. When the reaction temperature is lower than 150° C, the reaction between ammonia and nitrogen oxides barely proceeds. On the other hand, when it is higher than 400° C, the ammonia is consumed by the reaction with oxygen, which rate increases with the raising of the temperature, to result in a lowering of the conversion rate of nitrogen oxides, and when it is over 700° C, the conversion rate of nitrogen oxides is apparently lowered.

The amount of ammonia to be supplied to the reaction may be 0.3 to 4 mol, preferably 0.7 to 3 mol to 1 mol of nitrogen oxides (i.e. mixture of nitrogen dioxide and nitrogen monoxide). When the amount of ammonia is less than the above range, a high conversion rate of nitrogen oxides can not be expected even from the viewpoint of stoichiometry. When the gases to be treated contains oxygen, the ammonia is preferably used in an excess amount over the stoichiometric amount required for reducing the nitrogen oxides to nitrogen gas. However, the use of ammonia in a much greater amount than 4 mol (to 1 mol of nitrogen oxides) induces a high concentration of unreacted ammonia at the outlet of the reactor which may cause subsidiary air pollution and further is not preferable from the economical viewpoint.

The ammonia may be used in various forms, such as gaseous ammonia, aqueous ammonia or an aqueous solution of an ammonium salt (e.g. ammonium carbonate) which can be easily decomposed to ammonia at the reaction temperature.

The gases to be treated are preferably contacted with the catalyst at a space velocity of 2,000 to 100,000 $hr^{-1}$, more preferably 6,000 to 30,000 $hr^{-1}$. When the space velocity is less than 2,000 $hr^{-1}$, an excessively large reactor and an excessively large volume of catalyst must be used, and on the other hand, when it is over 100,000 $hr^{-1}$, the conversion rate of nitrogen oxides is lowered.

The present invention is illustrated by the following Examples but is not limited thereto.

In the Examples, the conversion rate of ammonia ($NH_3$), the conversion rate (removal rate) of nitrogen oxides ($NO_x$: $x$ is 1 or 2) and the non-conversion rate of nitrogen oxides ($NO_x$: $x$ is 1 or 2) are calculated by the following equations:

Conversion rate of ammonia (%)
$$= \frac{\text{Number of moles of reacted ammonia}}{\text{Number of moles of supplied ammonia}} \times 100$$
Conversion rate of nitrogen oxides (%)
$$= \frac{\text{Number of moles of removed nitrogen oxides}}{\text{Number of moles of contained nitrogen oxides}} \times 100$$
Non-conversion rate of nitrogen oxides (%)
$$= \frac{\text{Number of moles of nitrogen oxides released from the outlet of reactor}}{\text{Number of moles of contained nitrogen oxides}} \times 100$$

EXAMPLE 1

Monoethanolamine (24 ml) is dissolved in water (220 ml) and thereto is added ammonium metavanadate (14.04 g), and the mixture is agitated to give a solution. The solution is mixed with a solution of ammonium hepta(para)molybdate (21.19 g) and 28 % aqueous ammonia (18 ml) in water (40 ml).

To the mixed solution is added activated alumina (122.4 g) and then the mixture is evaporated at 80° C to remove water. After the mixed solution is completely penetrated into the activated alumina carrier, it is dried at 200° C until it becomes anhydrous.

The catalyst thus obtained is charged into a furnace, and the temperature of the furnace is raised from room temperature to 400° C over a period of 2 hours. The furnace is kept at this temperature for 5 hours, and then allowed to cool to room temperature. The metal oxide catalyst thus calcined has the atomic ratio of the active oxide forming elements (V and Mo) and the carrier forming metallic element (Al): $V_6Mo_6Al_{120}$. (hereinafter indicated in the same manner for a catalyst composition)

The catalyst (5 ml) is introduced into a glass-made reaction tube having 12 mm in inside diameter. A gas mixture containing 85.5 % by mol of nitrogen, 2.6 % by mol of oxygen, 11.9 % by mol of steam, 307 ppm of nitrogen monoxide and 453 ppm of ammonia is passed through the reaction tube at a space velocity of 13,600 hr$^{-1}$ and at 300° C. The conversion rate of ammonia is 99.7 %, and the conversion rate of nitrogen oxide is 98.0 %.

At the reaction temperature of 350° C, the conversion rate of ammonia is 100 % and the conversion rate of nitrogen oxide is 100 %, which means that the nitrogen oxide is completely removed. Besides, at the reaction temperature of 400° C, the conversion rate of ammonia is 100 % and the conversion rate of nitrogen oxide is 97.4 %.

EXAMPLE 2

Oxalic acid (174 g) is dissolved in water (500 ml) by heating, and thereto is added ammonium metavanadate (70.2 g). The mixture is heated with agitation to give a solution wherein the ammonium metavanadate is reduced by oxalic acid to give deep blue vanadyl oxalate having tetravalency.

The aqueous vanadyl oxalate thus obtained is mixed with a solution of ammonium hepta(para)molybdate (105.93 g) and 28 % aqueous ammonia (90 ml) in water (200 ml).

To the mixed solution is added 20 % by weight of silica sol (20 ml), and the mixture is evaporated to dryness. The dry catalyst thus obtained is charged into a furnace, and the temperature of the furnace is raised from room temperature to 250° C over a period of 2 hours. The furnace is kept at 250° C for 3 hours to effect primary calcination. After cooling, the catalyst is pulverized, and the powder is processed in a tablet machine to form tablets which are heated at 330° C for 6 hours to effect secondary calcination. The catalyst thus calcined has the atomic ratio of vanadium, molybdenum and silicon: $V_6Mo_6Si_{15}$.

In the same manner as described in Example 1, a gas mixture containing 86.2 % by mol of nitrogen, 2.6 % by mol of oxygen, 11.1 % by mol of steam, 309 ppm of nitrogen monoxide and 420 ppm of ammonia is passed through the catalyst at a space velocity of 13,500 hr$^{-1}$ and at 350° C. The conversion rate of ammonia is 100 % and the conversion rate of nitrogen oxide is 93.8 %.

EXAMPLES 3 to 7

In the same manner as described in Example 1, the reaction is carried out by using various catalysts as shown in Table 1, which are prepared in the same manner as in Example 1. The starting gases, reaction conditions and the results are shown in Table 1.

Table 1

| Example No. | Component of Catalyst | Components of the starting gases | | | | | | | | Space velocity hr$^{-1}$ | Reaction temperature ° C | Conversion rate of ammonia % | Conversion rate of nitrogen oxides % |
|---|---|---|---|---|---|---|---|---|---|---|---|---|---|
| | | N$_2$ % | O$_2$ % | H$_2$O % | SO$_2$ ppm | NO ppm | NO$_2$ ppm | Total nitrogen oxides ppm | NH$_3$ ppm | | | | |
| 3 | $V_6No_6Al_{120}$ | 85.4 | 2.6 | 11.8 | 0 | 1020 | 0 | 1020 | 1529 | 13700 | 350 | 91.0 | 99.2 |
| 4 | $V_9Mo_3Al_{120}$ | 85.5 | 2.6 | 11.9 | 0 | 307 | 0 | 307 | 453 | 13600 | 300 | 97.4 | 96.9 |
| 5 | $V_6Mo_6Al_{120}$ | 85.1 | 2.6 | 12.2 | 611 | 312 | 0 | 312 | 522 | 13700 | 350 | 100 | 98.2 |
| 6 | $V_6Mo_6Al_{120}$ | 85.5 | 2.6 | 11.9 | 0 | 0 | 354 | 354 | 437 | 13600 | 350 | 99.0 | 96.5 |
| 7 | $V_6Mo_6Al_{120}$ | 85.8 | 2.6 | 11.4 | 0 | 304 | 31 | 335 | 562 | 13700 | 350 | 99.8 | 96.7 |
| | | | | | | | | | | 27400 | 400 | 98.6 | 94.8 |

EXAMPLE 8

Monoethanolamine (40 ml) is dissolved in water (360 ml) and thereto is added ammonium metavanadate (23.40 g), and the mixture is agitated to give a solution. The solution is mixed with a solution of ammonium tungstate (10.44 g) and monoethanolamine (8 ml) in water (72 ml).

To the mixed solution is added activated alumina having a specific surface area of 160 m$^2$/g, and then the mixture is evaporated at 80° C to remove water. After the mixed solution is completely penetrated into the activated alumina carrier, it is dried at 200° C until it becomes completely anhydrous.

The catalyst thus obtained is charged into a furnace, and the temperature of the furnace is raised from room temperature to 400° C over a period of 2 hours. The furnace is kept at this temperature for 5 hours, and then allowed to cool to room temperature. The catalyst thus calcined has the atomic ratio of vanadium, tungsten and aluminum: $V_{10}W_2Al_{120}$.

The catalyst (5 ml) is introduced into a glass-made reaction tube having 12 mm in inside diameter. A gas mixture containing 85.2 % by mol of nitrogen, 2.6 % by mol of oxygen, 12.1 % by mol of steam, 555 ppm of nitrogen monoxide and 617 ppm of ammonia is passed through the reaction tube at a space velocity of 13,700 hr$^{-1}$ and at 250° C. The conversion rate of ammonia is 85.7 % and the conversion rate of nitrogen oxide is 97.2 %.

At the reaction temperature of 300° C, the conversion rate of ammonia is 99.5 % and the conversion rate of nitrogen oxide is 99.1 %. Besides, at the reaction temperature of 400° C, the conversion rate of ammonia is 100 % and the conversion rate of nitrogen oxide is 99.0 %.

EXAMPLE 9

A catalyst having the atomic ratio of vanadium, tungsten and silicon: $V_{10}W_2Si_{120}$ is prepared in a similar manner as in Example 8 by using spherical silica gel having a specific surface area of 600 m²/g instead of activated alumina.

The catalyst (113 ml) is introduced into a stainless steel reaction tube having 38 mm in inside diameter. A flue gas released from boiler wherein C-grade heavy oil is burnt is passed through the reaction tube at a space velocity of 6,500 hr$^{-1}$. The flue gas contains 210 to 320 ppm of nitrogen monoxide, 2 to 10 ppm of nitrogen dioxide, 450 to 830 ppm of sulfur oxides, 4 to 5 % by mol of oxygen, 7 to 10 % by mol of steam and 0.044 to 0.078 g/m³ of dust.

When the flue gas contains 255 ppm of nitrogen monooxide and 8 ppm of nitrogen dioxide (total nitrogen oxides: 263 ppm), ammonia (368 ppm) is supplied to the said flue gas to pass through the catalyst layer.

When the temperature of the catalyst layer is 350° C, the concentrations of ammonia, nitrogen monoxide and nitrogen dioxide at the outlet of the reaction tube are 22 ppm, 3 ppm and 0 ppm, respectively. The conversion rate of ammonia is 94.0 % and the conversion rate of nitrogen oxides is 98.8 %.

EXAMPLES 10 TO 12

In the same manner as described in Example 8, the reaction is carried out by using various catalysts as shown in Table 2, which are prepared in the same manner as described in Example 8 or 9. The starting gases, reaction conditions and the results are shown in Table 2.

EXAMPLE 14

A catalyst having the atomic ratio of vanadium, molybdenum, tungsten and silicon: $V_8Mo_2W_2Si_{15}$ is prepared in a similar manner as in Examples 2 and 8.

In the same manner as described in Example 1, a gas mixture containing 85.1 % by mol of nitrogen, 2.8 % by mol of oxygen, 12.0 % by mol of steam, 679 ppm of nitrogen monoxide and 666 ppm of ammonia is passed through the catalyst at the space velocity of 13,700 hr$^{-1}$ and at 300° C. The conversion rate of ammonia is 90.8 % and the conversion rate of nitrogen oxide is 99.6 %.

REFERENCE EXAMPLE 1

A catalyst having the atomic ratio of vanadium, molybdenum and aluminum: $V_3Mo_9Al_{60}$ is prepared in a similar manner as described in Example 1.

In the same manner as described in Example 1, a gas mixture containing 84.5 % by mol of nitrogen, 2.6 % by mol oxygen, 11.6 % by mol of steam, 4,460 ppm of nitrogen monoxide and 6,810 ppm of ammonia is passed through the catalyst at a space velocity of 13,700 hr$^{-1}$ and at 350° C. The conversion rate of ammonia is 100 % and the conversion rate of nitrogen oxide is 94.4 %.

When a gas mixture containing 86.1 % by mol of nitrogen, 2.6 % by mol of oxygen, 11.1 % by mol of steam, 385 ppm of nitrogen monoxide and 397 ppm of ammonia is passed through the catalyst at a space velocity of 13,500 hr$^{-1}$ and at 325° C., the conversion rate of ammonia is 100 % and the conversion rate of nitrogen oxide is 60.7 %. At the reaction temperature of 350° C, the conversion rate of ammonia is 100 % and the conversion rate of nitrogen oxide is 70.5 %. Besides, at 400°

Table 2

| Example No. | Component of Catalyst | N₂ % | O₂ % | H₂O % | SO₂ ppm | NO ppm | NO₂ ppm | Total nitrogen oxides ppm | NH₃ ppm | Space velocity hr$^{-1}$ | Reaction temperature ° C | Conversion rate of ammonia % | Conversion rate of nitrogen oxides % |
|---|---|---|---|---|---|---|---|---|---|---|---|---|---|
| 10 | $V_{11}W_1Al_{120}$ | 85.9 | 2.6 | 11.4 | 0 | 570 | 0 | 570 | 581 | 13500 | 300 | 88.3 | 99.2 |
| 11 | $V_8W_4Al_{120}$ | 85.2 | 2.6 | 12.1 | 0 | 555 | 0 | 617 | 617 | 13700 | 300 | 99.0 | 97.1 |
| 12 | $V_{10}W_2Si_{120}$ | 85.9 | 2.6 | 11.4 | 0 | 562 | 0 | 562 | 521 | 13600 | 300 | 97.2 | 96.1 |

EXAMPLE 13

A catalyst having the atomic ratio of vanadium, molybdenum, tungsten and aluminum (in activated alumina): $V_8Mo_3W_1Al_{120}$ is prepared in a similar manner as in Examples 1 and 8.

In the same manner as described in Example 1, a gas mixture containing 86.2 % by mol of nitrogen, 2.9 % by mol of oxygen, 11.4 % by mol of steam, 657 ppm of nitrogen monoxide and 697 ppm of ammonia is passed through the catalyst at a space velocity of 13,700 hr$^{-1}$ and at 250° C. The conversion rate of ammonia is 81.4 % and the conversion rate of nitrogen oxide is 93.0 %.

At the reaction temperature of 350° C, the conversion rate of ammonia is 91.6 % and the conversion rate of nitrogen oxide is 98.8 %.

C, the conversion rate of ammonia is 100 % and the conversion rate of nitrogen oxide is 48.4 %.

As is made clear from the above results, according to the method of Reference Example 1, when the concentration of nitrogen oxide is lower, the conversion rate of nitrogen oxide is extremely decreased in comparison with that involving a high concentration of nitrogen oxide. Besides, when the concentration of nitrogen oxide is similar to that in Examples 2 to 7, the conversion rate of nitrogen oxide is extremely low in Reference Example 1.

REFERENCE EXAMPLES 2 TO 4

In the same manner as described in Example 1, the reaction is carried out by using various catalysts as shown in Table 3, which are prepared in a similar manner as described in Example 1 or 8. The starting gases, reaction conditions and the results are shown in Table 3.

Table 3

| Reference Example No. | Component of Catalyst | Components of the starting gases | | | | | | | | Space velocity hr$^{-1}$ | Reaction temperature °C | Conversion rate of ammonia % | Conversion rate of nitrogen oxides % |
|---|---|---|---|---|---|---|---|---|---|---|---|---|---|
| | | N$_2$ % | O$_2$ % | H$_2$O % | SO$_2$ ppm | NO ppm | NO$_2$ ppm | Total nitrogen oxides ppm | NH$_3$ ppm | | | | |
| 2 | V$_{12}$Al$_{120}$ | 86.4 | 2.6 | 11.0 | 0 | 578 | 0 | 578 | 556 | 13500 | 250 | 72.7 | 75.7 |
| | | | | | | | | | | | 300 | 96.8 | 86.9 |
| 3 | W$_{12}$Al$_{120}$ | 86.0 | 2.6 | 11.3 | 0 | 594 | 0 | 594 | 536 | 13500 | 250 | 42.3 | 44.3 |
| 4 | V$_4$W$_8$Al$_{120}$ | 85.6 | 2.6 | 11.7 | 0 | 558 | 0 | 558 | 572 | 13600 | 250 | 83.0 | 70.0 |
| | | | | | | | | | | | 300 | 93.3 | 80.4 |

What is claimed is:

1. A process for the selective removal of nitrogen oxides from waste gases containing 1,500 ppm or less in gas volume of nitrogen oxides, which comprises reducing said nitrogen oxides with ammonia by contacting said waste gases with ammonia in the presence of a complex metal oxide catalyst consisting essentially of vanadium oxide and at least one member selected from the group consisting of molybdenum oxide and tungsten oxide with an atomic ratio of the oxide forming elements of:

$$V_{12-x-y}Mo_xW_y$$

wherein $0 \leq x \leq 8$, $0 \leq y \leq 5$ and $0.3 \leq x + y \leq 8$.

2. The process according to claim 1, wherein the catalyst has the atomic ratio of the oxide forming elements of $V_{12-x}Mo_x$ wherein $2 \leq x \leq 8$.

3. The process according to claim 1, wherein the catalyst has the atomic ratio of the oxide forming elements of $V_{12-y}W_y$ wherein $0.3 \leq y \leq 5$.

4. The process according to claim 1, wherein the catalyst has the atomic ratio of the oxide forming elements of $V_{12-x-y}Mo_xW_y$ wherein $0 \leq x \leq 4$, $0 \leq y \leq 3$ and $1 \leq x + y \leq 5$.

5. The process according to claim 1, wherein the ammonia is added in an amount of 0.3 to 4 moles per 1 mole of the nitrogen oxides.

6. The process according to claim 5, wherein the amount of ammonia is in the range of 0.7 to 3 moles per 1 mole of the nitrogen oxides.

7. The process according to claim 1, wherein the contact of the waste gases with the catalyst is carried out at a temperature of 150° to 700° C.

8. The process according to claim 7, wherein the temperature is in the range of 200° to 400° C.

9. The process according to claim 1, wherein the waste gases are contacted with the catalyst at a space velocity of 2,000 to 100,000 hr$^{-1}$.

10. The process according to claim 9, wherein the space velocity is in the range of 6,000 to 30,000 hr$^{-1}$.

11. A process for the selective removal of nitrogen oxides from waste gases containing 100 to 1,500 ppm in gas volume of nitrogen oxides, which comprises reducing said nitrogen oxides with ammonia by contacting said waste gases with ammonia in the presence of a complex metal oxide catalyst consisting essentially of vanadium oxide and at least one member selected from the group consisting of molybdenum oxide and tungsten oxide with an atomic ratio of the oxide forming elements of:

$$V_{12-x-y}Mo_xW_y$$

wherein $0 \leq x \leq 8$, $0 \leq y \leq 5$ and $0.3 \leq x + y \leq 8$, at a temperature of 150° to 700° C. and at a space velocity of 2,000 to 100,000 hr$^{-1}$.

12. The process according to claim 11, wherein the ammonia is employed in an amount of 0.3 to 4 moles per 1 mole of the nitrogen oxides.

13. A process for the selective removal of nitrogen oxides from waste gases containing 1,500 ppm or less in gas volume of nitrogen oxides, which comprises reducing said nitrogen oxides with ammonia by contacting said waste gases with ammonia in the presence of a metal oxide catalyst consisting essentially of vanadium oxide, molybdenum oxide and tungsten oxide with an atomic ratio of the oxide forming elements of:

$$V_{12-x-y}Mo_x-W_y$$

wherein $0 \leq x \leq 4$, $0 \leq y \leq 3$ and $1 \leq x + y \leq 5$.

14. The process according to claim 13, wherein the ammonia is added in an amount of 0.3 to 4 moles per 1 mole of the nitrogen oxides.

15. The process according to claim 14, wherein the contact of the waste gases with the catalyst is carried out at a temperature of 150° to 700° C. and at a space velocity of 2,000 to 100,000 hr$^{-1}$.

* * * * *